(12) United States Patent
Chawla

(10) Patent No.: US 6,360,368 B1
(45) Date of Patent: Mar. 19, 2002

(54) METHOD AND APPARATUS FOR REDUCING OVERHEAD ASSOCIATED WITH CONTENT PLAYBACK ON A MULTIPLE CHANNEL DIGITAL MEDIA SERVER HAVING ANALOG OUTPUT

(75) Inventor: Rajeev Chawla, Fremont, CA (US)

(73) Assignee: Sun Microsystems, Inc., Mountain View, CA (US)

( * ) Notice: Subject to any disclaimer, the term of this patent is extended or adjusted under 35 U.S.C. 154(b) by 0 days.

(21) Appl. No.: 08/904,965

(22) Filed: Aug. 1, 1997

(51) Int. Cl.[7] ............................................. H04N 7/173
(52) U.S. Cl. ............................... 725/94; 705/88; 705/95
(58) Field of Search ............................. 725/86, 87, 88, 725/91, 93, 94, 95; 709/217–219

(56) References Cited

U.S. PATENT DOCUMENTS 5,864,682 A * 1/1999 Porter et al. .................. 725/87
6,253,375 B1 * 6/2001 Gordon et al. ................ 725/88

* cited by examiner

Primary Examiner—John W. Miller
(74) Attorney, Agent, or Firm—Blakely, Sokoloff, Taylor & Zafman

(57) ABSTRACT

A method and apparatus for delivering analog data on demand from a multiple channel digital media server are provided. A digital data stream is admitted to a media server in response to a user selecting a program for playback. A data structure is initialized and maintained for the admitted digital data stream, the data structure controlling the conversion of the admitted digital data stream to an analog data stream on the converter channel. The data structure initialization comprises initializing a state of the admitted digital data stream and a control bit cache flag at a first requested state change for the admitted digital data stream, typically a play command issued by the user. A number of control bits of a converter channel are also initialized using the converter control channel at a first requested state change of the admitted digital data stream. The data structure prevents the reinitialization of the control bits of the converter channel during state changes of the admitted digital data streams.

20 Claims, 15 Drawing Sheets

METHOD AND APPARATUS FOR REDUCING OVERHEAD ASSOCIATED WITH CONTENT PLAYBACK ON A MULTIPLE CHANNEL DIGITAL MEDIA SERVER HAVING ANALOG OUTPUT

FIELD OF THE INVENTION

This invention relates to media server systems. More particularly, this invention relates to providing analog output from a multiple channel media server system.

BACKGROUND OF THE INVENTION

A typical media server system consists of a video server connected to clients via a high speed network. The media server is capable of delivering video to these clients for real-time playback, the video delivery being client driven. Clients communicate with the server to control video play, playback speed (normal, fast-forward, rewind, stop, pause), and build playlists. All references to video and video data herein include the corresponding audio and audio data.

The media server is generally a combination of standard server hardware and software that is optimized for and dedicated to the storage and delivery of digital video and audio streams. One prior art example of such a media server is the direct satellite broadcast system. The direct satellite broadcast system broadcasts digital streams which are decoded at the receiver end by a set-top box. As digital streams are delivered to the viewer, an expensive converter is required in the set-top box to decompress and decode the digital streams.

In another prior art media server system, the digital Sun™ MediaCenter™ manufactured by Sun Microsystems Computer Company of Mountain View, California, the server software includes a kernel, network interface drivers dedicated to continuous-media output, a Media File System (MFS) optimized for the demands of the delivery of isochronous bit streams, a Media Stream Manager (MSM) that controls the playback of multimedia streams that are stored on the media server, and a Content Manager (CM) that allows users to move content between servers or between a server and a client. The Sun™ MediaCenter™ server delivers Motion Picture Experts Group (MPEG) bit streams at a constant bit rate. The content of the streams are stored on an array of disks. The server guarantees that, unless the server hardware fails, once a stream request is accepted, it will be delivered at the specified constant bit rate until the stream ends or the server is told to stop.

Some prior art media servers are designed to output digital streams using asynchronous transfer mode (ATM) or local-area networks (LAN). In an ATM environment, one or more media servers are directly connected to an ATM switch via ATM host adapters. Digital video streams are sent to clients using ATM virtual circuits. In the LAN environment, each media server is connected on one high-speed 100BaseT subnetwork via one or more ethernet host adapters. Digital video streams are sent to their destinations using LAN packets. Destination clients can access the video streams by connecting directly to one of the 100BaseT networks.

In the previously discussed digital Sun™ MediaCenter ™ server, the Media Stream Manager (MSM) that provides users access to the server uses a MSM Client Application Programmer's Interface (MSMC API) that allows the manipulation of video stream playback on the server. The MSM is a layer of application server software that allows the user to control and manipulate playback of video streams using the MSMC API. For example, it implements the functionality that enables fast forward, rewind, and other operations on video streams. The MSM is layered directly on top of the MFS.

A first scenario of the MSMC API's position in a prior art digital server environment consists of a workstation client using the MSMC API to control the playback of digital video streams to itself. A second scenario of the MSMC API's position in a prior art digital server environment consists of a non-video on-demand application that uses the MSMC API to control the playback of digital video streams to remote clients. A third scenario of the MSMC API's position in a prior art digital server environment consists of a video on-demand application that acts as a proxy to translate control commands originating from a set-top into equivalent MSMC API calls to the media server. The media server plays the digital video streams to the set-top directly, but the control commands from the set-top are routed via the proxy application, which translates the set-top command control protocol to the MSMC API.

Full-motion uncompressed digital video demands a large storage space, and a high data transfer rate. Thus, the digital video is compressed before storing it on a video server. The MPEG-1 and MPEG-2 are commonly used encoding standards for representing digitally encoded and compressed video and audio streams. A client wishing to playback a video stored on a media server must decompress and decode the digital video stream delivered by the video server. Decompressing and decoding by the client requires a great deal of computer processing and a large amount of computer memory. Consequently, it is desirable to decompress and decode the digital video prior to delivery to a client so as to deliver analog video to the client. This allows delivery of video in the existing cable network infrastructure. It also eliminates the need for an expensive MPEG converter in the set-top box at the user client receiver.

However, as the digital video is decompressed and decoded prior to delivery to a client, the client is required to remotely interact with the media server system using a set-top box to indicate program selections. These client program selections are used to control program delivery, so it is desirable for the media server to select and communicate the appropriate control bits to the MPEG converter of the media server in order to decode and present to the viewer the selected program materials. Setting of control bits on a decoding channel is time consuming. When there is only one central processing unit per MPEG decoder, setting control bits for one converter channel can adversely affect playback on other converter channels due to data starvation. Data starvation on a converter channel will cause an interruption of video stream delivery to the client on that channel. Consequently, it is desirable to reduce the probability of interruption of video stream delivery as a result of data starvation.

SUMMARY OF THE INVENTION

A method and apparatus for delivering analog data on demand from a multiple channel digital media server are provided. According to one aspect of the invention, a digital data stream is admitted to a media server in response to a user selecting a program for playback. Bandwidth on the media server is reserved in order to deliver the digital data stream at a specified bitrate. A data structure is initialized and maintained for the admitted digital data stream, the data structure controlling the conversion of the admitted digital data stream to an analog data stream on the converter channel. The data structure initialization comprises initializing a state of the admitted digital data stream and a control bit cache flag at a first requested state change for the admitted digital data stream, typically a play command issued by the user. A number of control bits of a converter channel are also initialized using the converter control channel at a first requested state change of the admitted digital data stream. The data structure prevents the reinitialization of the control bits of the converter channel during state changes of the admitted digital data streams.

In one embodiment the media server comprises a converter having at least one control channel and at least one converter channel. The converter channel has an initialized number of control bits. Moreover, the media server comprises a data structure for each admitted digital data stream. The data structure controls the conversion of the admitted digital data streams to analog data streams on the converter channels. The data structure prevents reinitialization of the control channel control bits during state changes of the admitted digital data streams.

These and other features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figure of the accompanying drawings, in which like references indicate similar elements and in which.

DETAILED DESCRIPTION OF THE INVENTION

A method and apparatus for providing analog output and managing channels on a multiple channel digital media server are provided. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Figure 1:
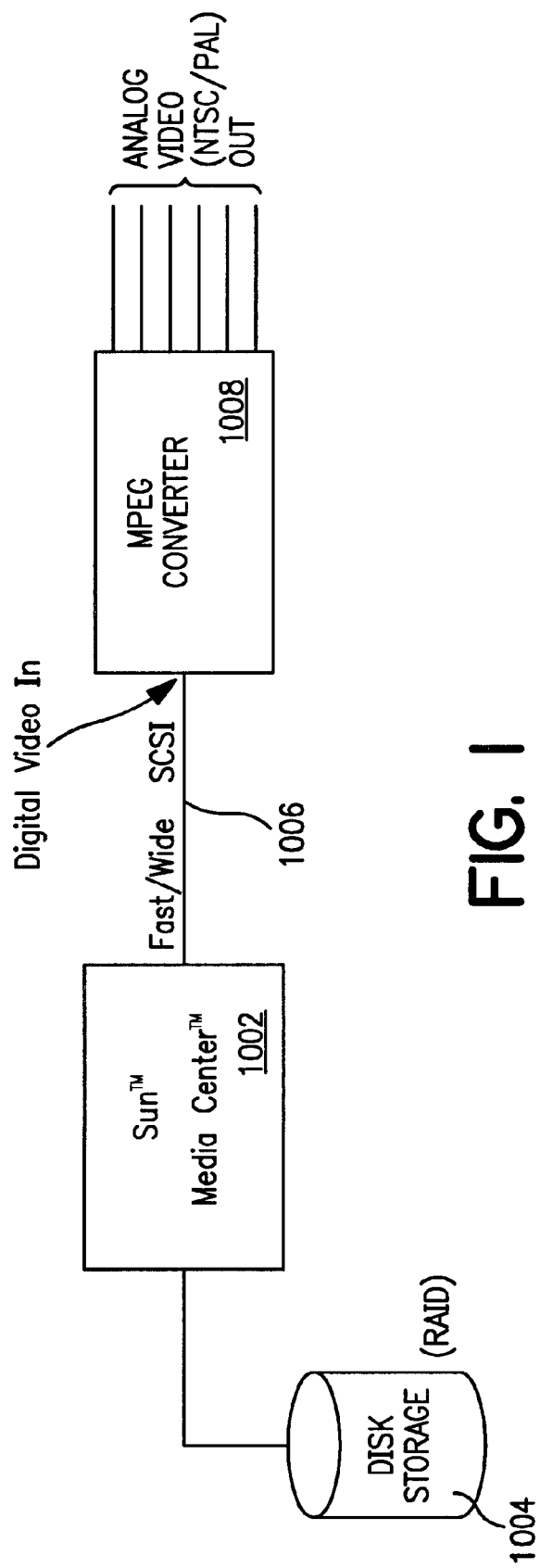
FIG. 1 illustrates the overall architecture for providing analog video in one embodiment of the present invention.

FIG. 1 illustrates the overall architecture for providing analog video in one embodiment of the present invention. The Sun™ MediaCenter™ media server 1002 stores content in disk storage 1004. The disk storage 1004 may comprise an array of disks. The media server 1002 is connected through a small computer standard interface (SCSI) bus 1006 to one or more MPEG converters 1008. The MPEG converters 1008 decompress and decode digital video and audio data. In one embodiment of the present invention, MPEG converters are used having 6 channels. Each of the MPEG converters 1008 produces analog baseband data.

Figure 2:
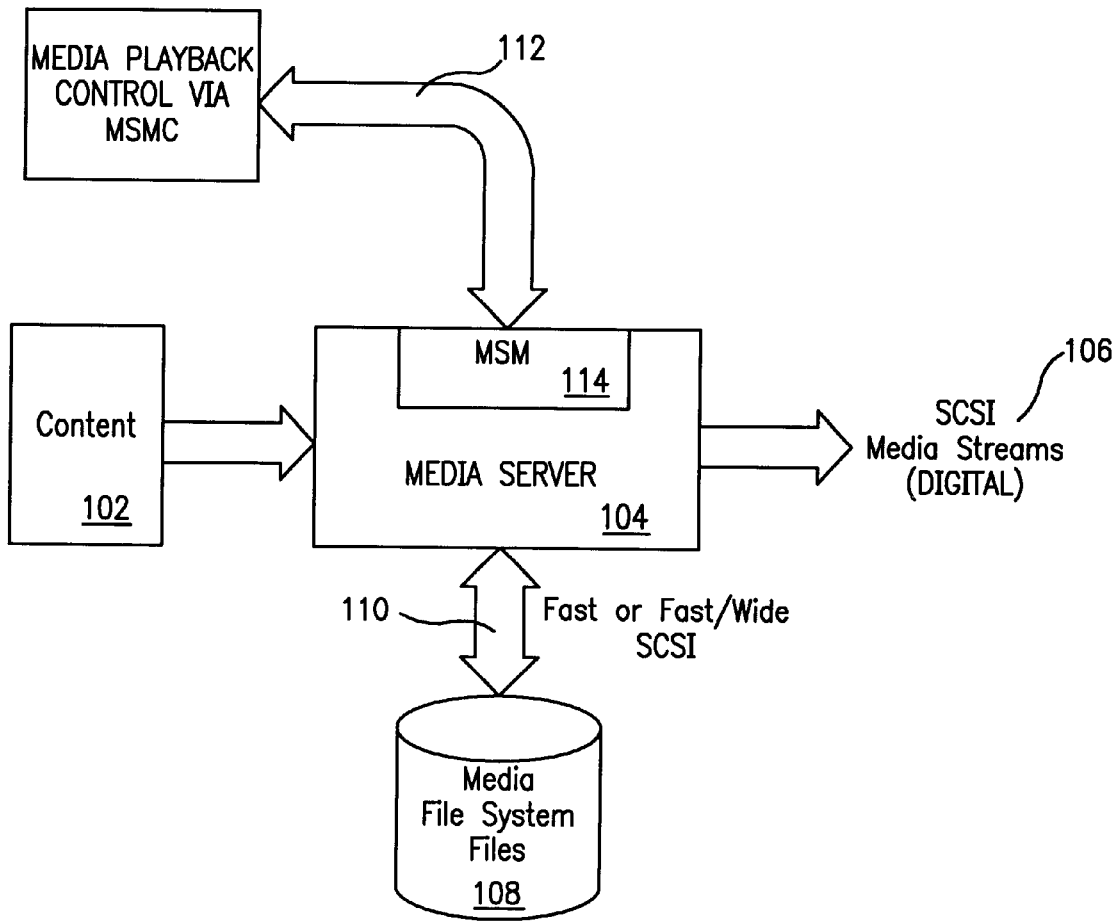
FIG. 2 illustrates the hardware architecture of one embodiment of the media server of the present invention.

FIG. 2 illustrates the hardware architecture of one embodiment of the media server of the present invention. Content 102 is loaded onto the media server 104 via the server's Content Manager (CM). The content 102 source may be, but is not limited to, tape, network-accessible files, or live sources. External disk subsystems 108 are dedicated to the storage of multimedia files. Fast or Fast/Wide SCSIs 110 couple the external disk subsystems 108 to the media server 104. The SCSI digital video streams 106 are controlled through network interfaces 112 using the Media Stream Manager 114.

Figure 3:
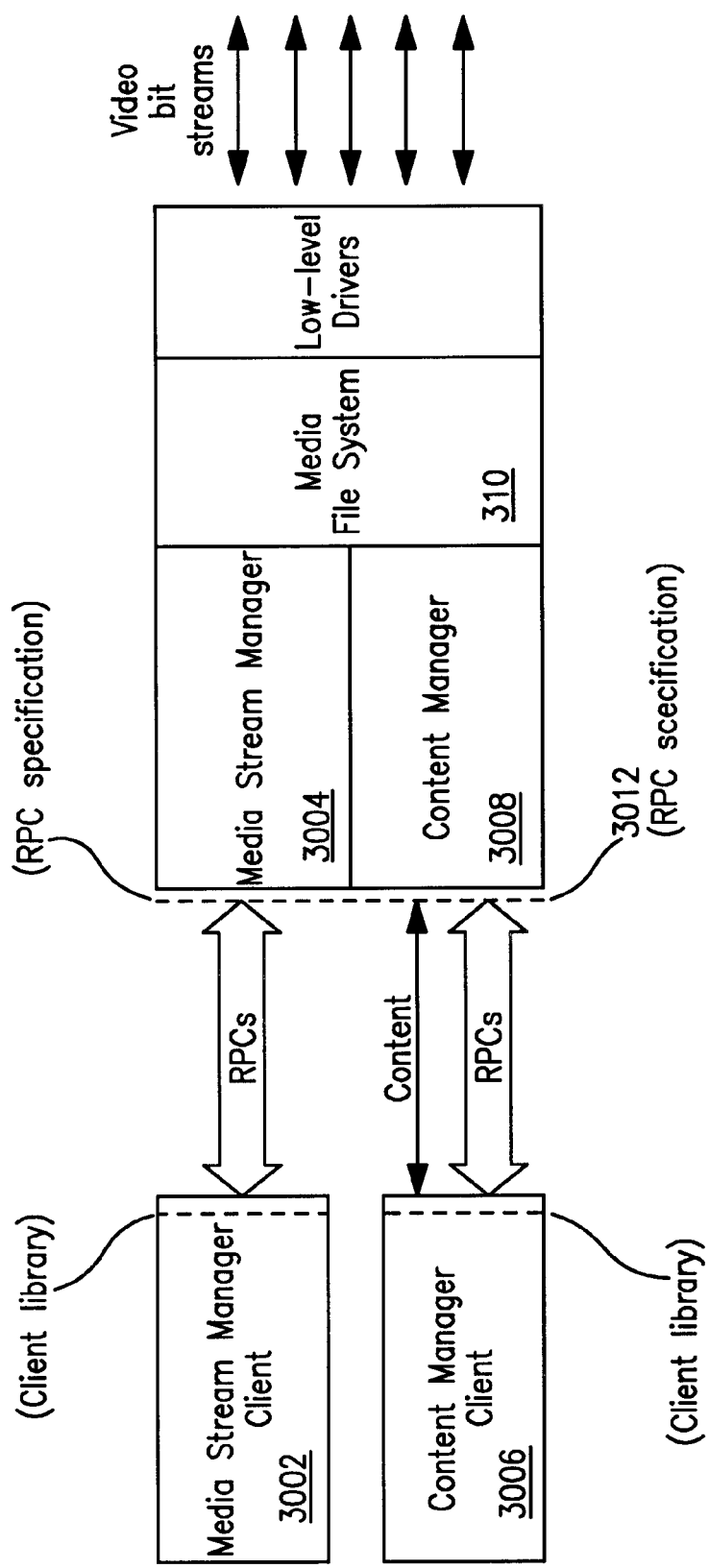
FIG. 3 illustrates the two different sets of programmatic interfaces of the software of one embodiment of the media server of the present invention.

FIG. 3 illustrates the two different sets of programmatic interfaces of the software of one embodiment of the media server of the present invention. The two programmatic interfaces include one interface 3002 for the MSM 3004 and one interface 3006 for the CM 3008. The MSM 3004 is the means by which users of the media server play titles on the server. The MSM 3004 supports video cassette recorder-like abstractions, for example "play a title", "fast-forward a title", and "play title X at <time specification>". The CM 3008 is the means by which users of the media server move content between media servers or between media servers and a user's machine. The CM 3008 stores encoded bit streams so that they are available to the MSM 3004. The CM 3008 also enables the backing up and restoring of the MFS 3010, in which video files are stored. Both the MSM 3004 and the CM 3008 provide platform-independent RPC specifications 3012 and both offer client libraries based on those lower-level specifications.

Figure 4:
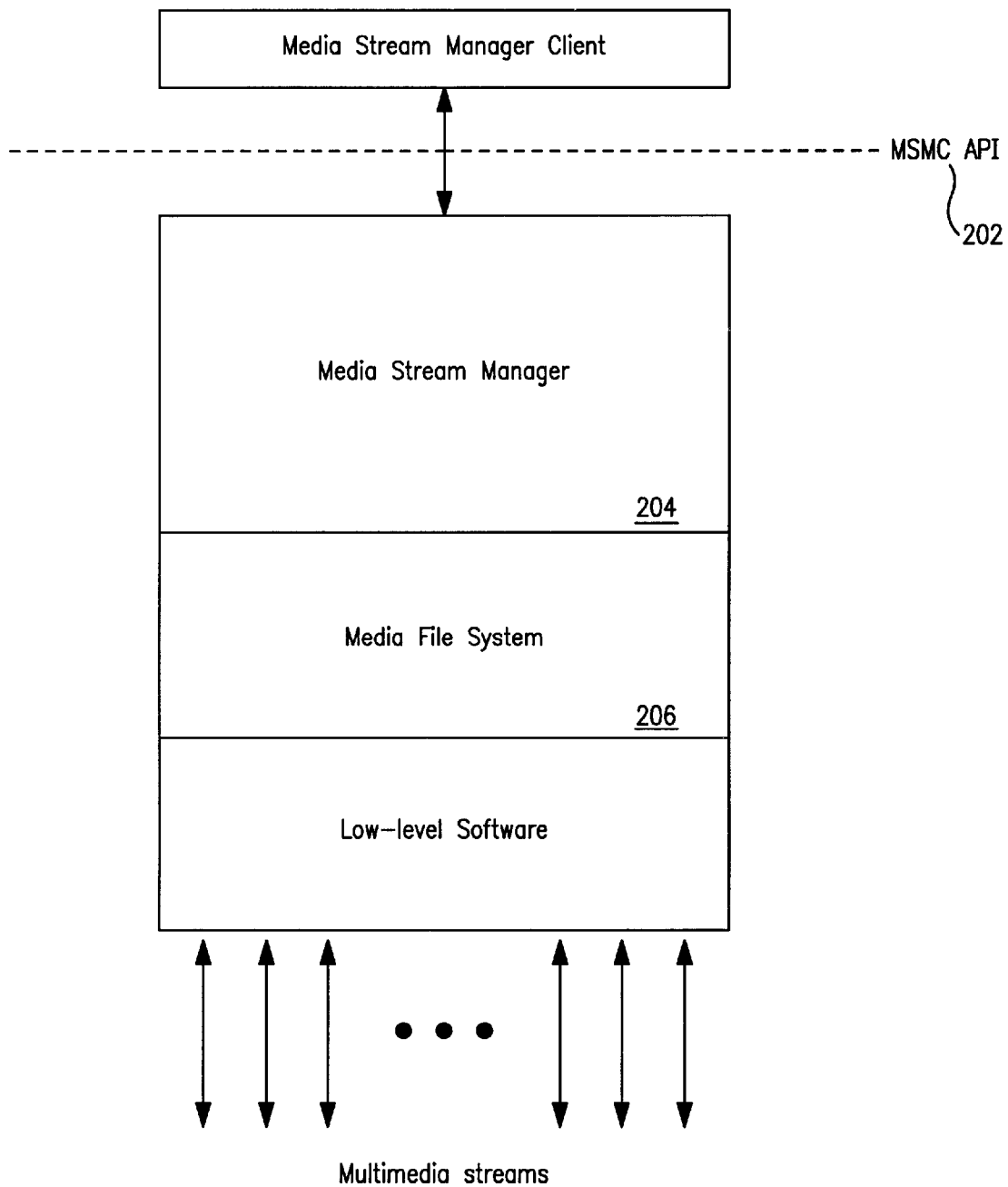
FIG. 4 illustrates the Media Stream Manager Client Application Programmer's Interface's (MSMC API's) position in the server architecture.

FIG. 4 illustrates the MSMC API's 202 place in the server architecture. The MSM 204 is a layer of application server software that allows the user to control and manipulate video streams using the MSMC API 202. For example, it implements the functionality that enables fast forward, rewind, and other operations on video streams. The MSM 204 is layered directly on top of the MFS 206.

Figure 5:
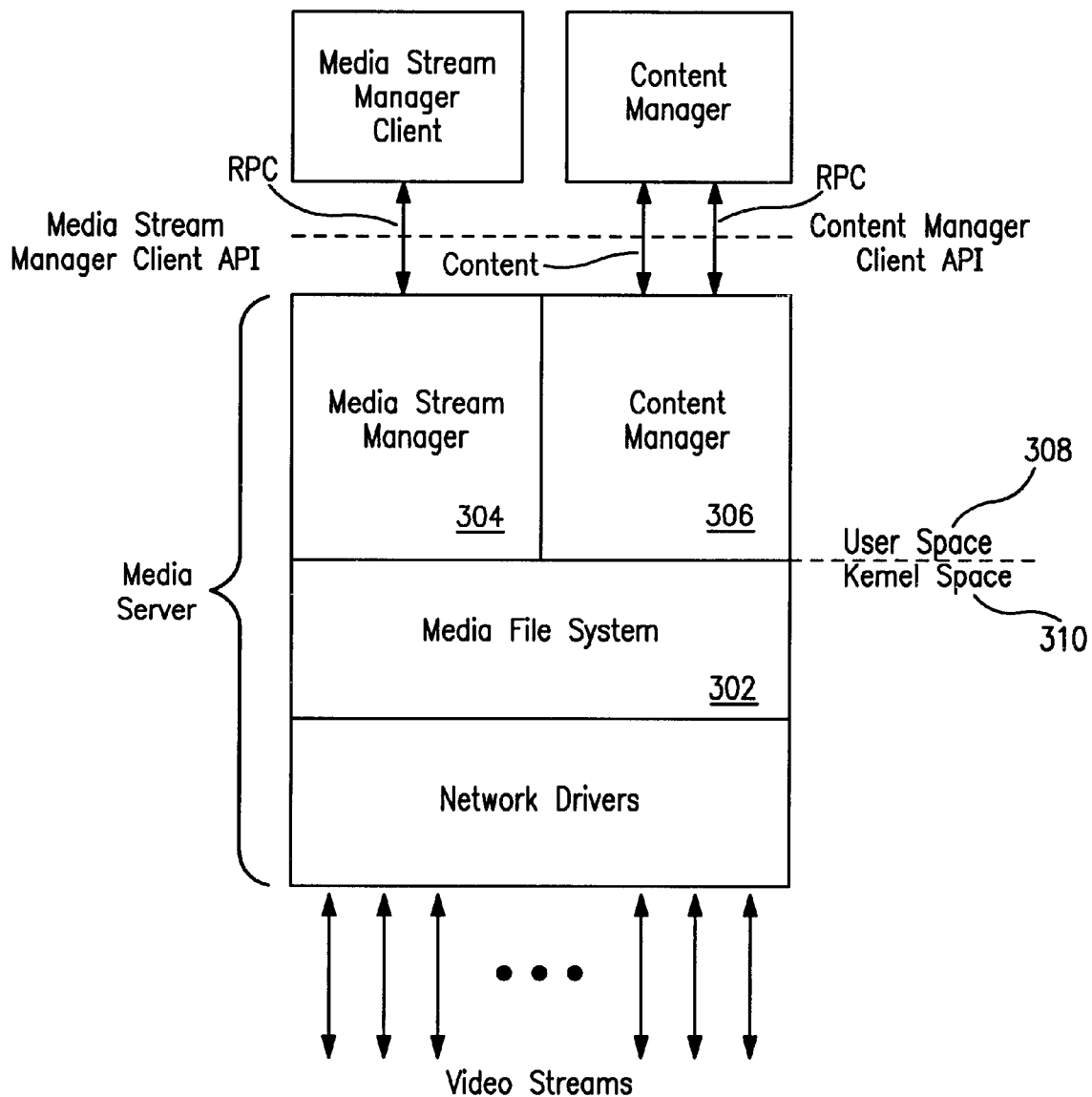
FIG. 5 illustrates the relationship between the major software components of the media server of one embodiment of the present invention.

FIG. 5 illustrates the relationship between the major software components of the media server of one embodiment of the present invention. The major server software components include the Media File System 302, the Media Stream Manager 304, and the Content Manager 306. The MSM 304 and the CM 306 both reside in user space 308.

Figure 6:
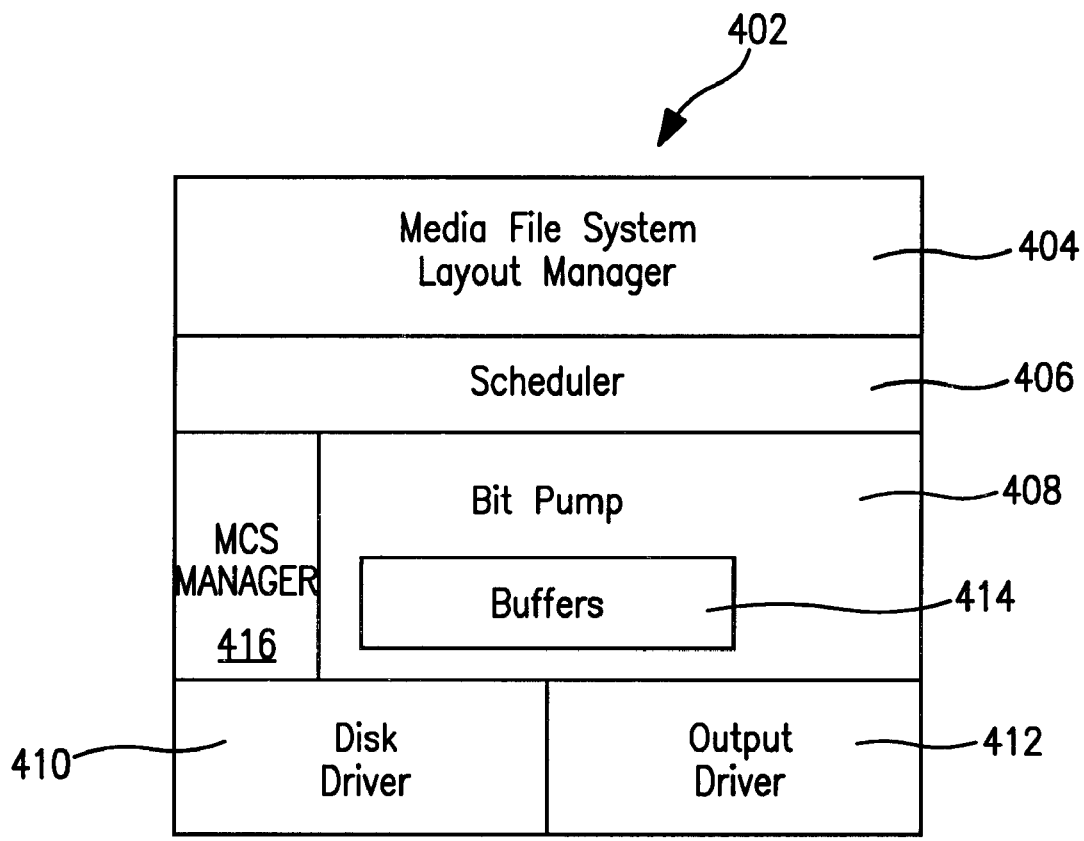
FIG. 6 illustrates the basic subsystems of the Media File System (MFS) of one embodiment of the present invention.

The MFS 302 is optimized for the demands of the delivery of isochronous bit streams and, as such, is designed to deliver multimedia data from an array of attached disks to an output network. FIG. 6 illustrates the basic subsystems of the MFS 402 of one embodiment of the present invention. The basic subsystems include a file system layout manager 404, a scheduler 406, a bit pump 408, a disk driver 410, and an output driver 412. The file system layout manager 404 allocates and deallocates disk blocks to media server files. The scheduler 406 sorts and schedules disk input/output, manages bit pump buffers 414, performs admission control, and schedules output driver 412 activity. The bit pump 408 allocates internal buffering and efficiently transfers data between the disk 410 and the output drivers 412 using the internal buffers 414. The bit pump 408 is dependent on the SCSI output driver. The disk driver 410 efficiently transfers disk data to the internal buffers 414. The output driver 412 is responsible for low-level output device management and encapsulating outgoing data, and for efficiently transferring data from the internal buffers 414 to the output medium. The scheduler 406, bit pump 408, and the media channel selection manager 416 reside in kernel space.

Referring again to FIG. 5, the MSM 304 provides users access to the media server by controlling the video streams stored in the MFS. The MSM implements a set of procedures that interact with the MFS to allow the user to stop, start, pause, and resume video bit streams. A central notion of the MSM is a playlist, from which titles can be played on a time-synchronized basis. Each playlist is associated with a player, which can be passed among multiple clients.

The CM 306 provides for the loading of content onto the media server. The CM 306 allows users to move content between servers or between a server and a client.

Figure 7:
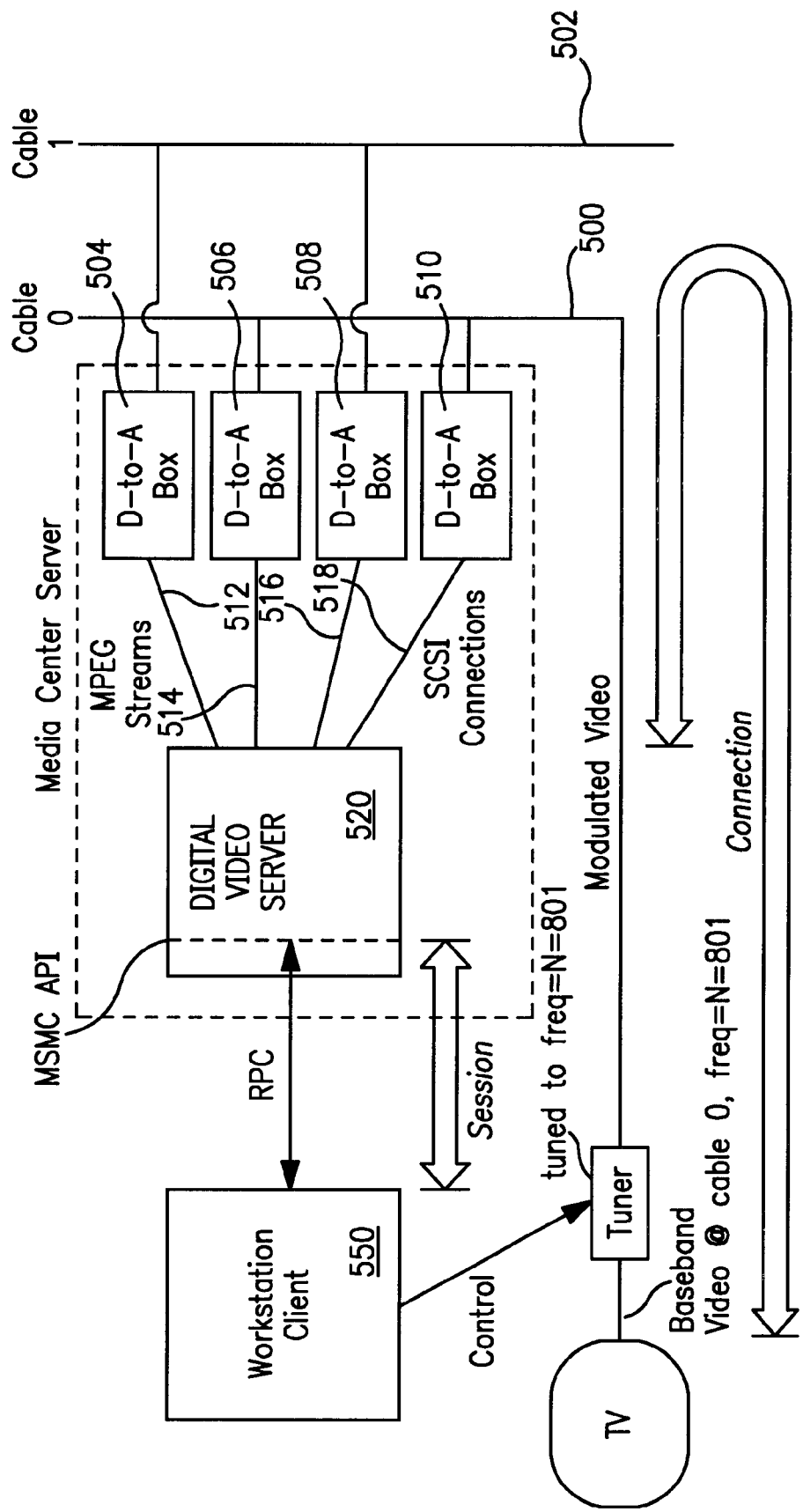
FIG. 7 illustrates the media server for providing analog video output in one embodiment of the present invention.

FIG. 7 illustrates the media server for providing analog video output in one embodiment of the present invention. This media server system is coupled to transmission channels 500 and 502 for transmission of analog video and audio data to at least one user or client 550. In one embodiment, transmission channels 500 and 502 are two of a number of channels comprising a high-speed network over which modulated video and audio are transmitted to clients. The transmission channels 500 and 502 are coupled to the output ports of converters or decoders 504–510.

An embodiment of the media server has, but is not limited to, four converters wherein each converter contains, but is not limited to, six channel cards. Thus, a group of four MPEG converters collectively provide 24 channels. The converters 504–510 decompress digital video and audio data and convert or decode the digital video and audio data to analog video and audio data thereby providing analog baseband data. The converters 504–510 are coupled to the video server 520 using SCSI buses 512–518. The converters 504–510 receive video streams from the video server over the SCSI buses 512–518. The media server system uses modulators that modulate the analog baseband video and audio signals with a carrier frequency to produce cable television signals. These decoders accept, but are not limited to, MPEG-2 video streams. The cable television signals are delivered to a cable transmission system or network. In another embodiment of the media server of the present invention, decoders modulate the analog baseband video and audio signals with a carrier frequency to produce ultrahigh frequency and very high frequency television signals for broadcast.

An embodiment of the media server of the present invention uses a converter having multiple converting channels, and uses a media server system having multiple converters. The media server must manage these multiple converting channels and must manage the timely delivery of digital video and audio data to these converting channels. Once the digital video and audio data is converted to analog video and audio data, the media server uses multiple frequencies and multiple paths over a cable network to deliver the analog video and audio data to clients. Therefore, a Media Channel Selection (MCS) manager is implemented in one embodiment of the present invention in order to manage the channels on the multiple channel media server.

The MCS manager manages a profile of the media server system and controls the allocation and deallocation of channels based on this system profile. The MCS manager establishes a mapping among analog modulation frequencies, SCSI port logical unit numbers, specific decoder cards within converters and specific cables, systems, and networks. Furthermore, the MCS manger allocates and deallocates the aforementioned resources in response to the established mapping and user communications. The MCS manager is implemented as a kernel driver in kernel space as part of the operating system of the media server. The bit pump of the MFS is responsible for timely delivery of video and audio data. Consequently, the MCS manager is optimized to talk to the bit pump directly with regards to allocating and deallocating channels. This direct communication with the bit pump allows for a non-intrusive management of the decoding channels. Implementation of the MCS manager in the kernel prevents leaking of freed channels when a playback is aborted.

Figure 8:
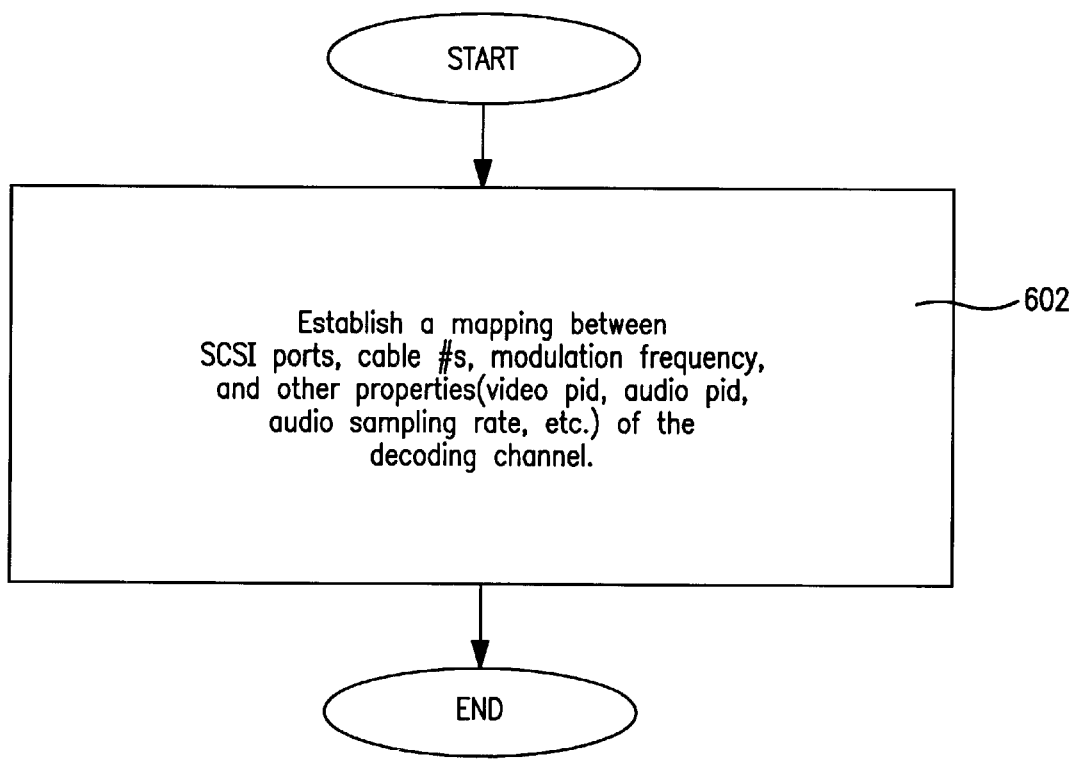
FIG. 8 illustrates a flowchart for initialization of the Media Channel Selection (MCS) manager in one embodiment of the present invention.

At media server system startup, the MCS manager is initialized. FIG. 8 illustrates a flowchart for initialization of the MCS manager in one embodiment of the present invention. At initialization, step 602, a mapping is established among decoder channels, the SCSI ports through which the media server is coupled to the converters, a cable number to which the decoding channels are connected, the output ports of the media server, and the default modulation frequency for the corresponding decoding channels. A mapping is also established among the video program identification, the audio program identification, and the data sampling rate properties of the media server, at step 602.

Following initialization of the MCS manager, the media server may receive client requests from, for example, a set-top box. When a client communicates to the media server MSM to start playback of a video, the media server must allocate a decoding channel for this client. The MSM client specifies a value that maps to a specific decoder box and, potentially, a specific channel card within that decoder. The bit pump communicates with the MCS manager to allocate a channel. The provisions are also made for the client to pick a particular channel if the client so chooses. The MCS manager allocates a channel and directs the bit pump to deliver video and audio on that channel. The MCS manager also communicates with the decoder box to set the modulation frequency of that channel to that specified by the client or the default modulation frequency as determined at initialization.

Figure 9:
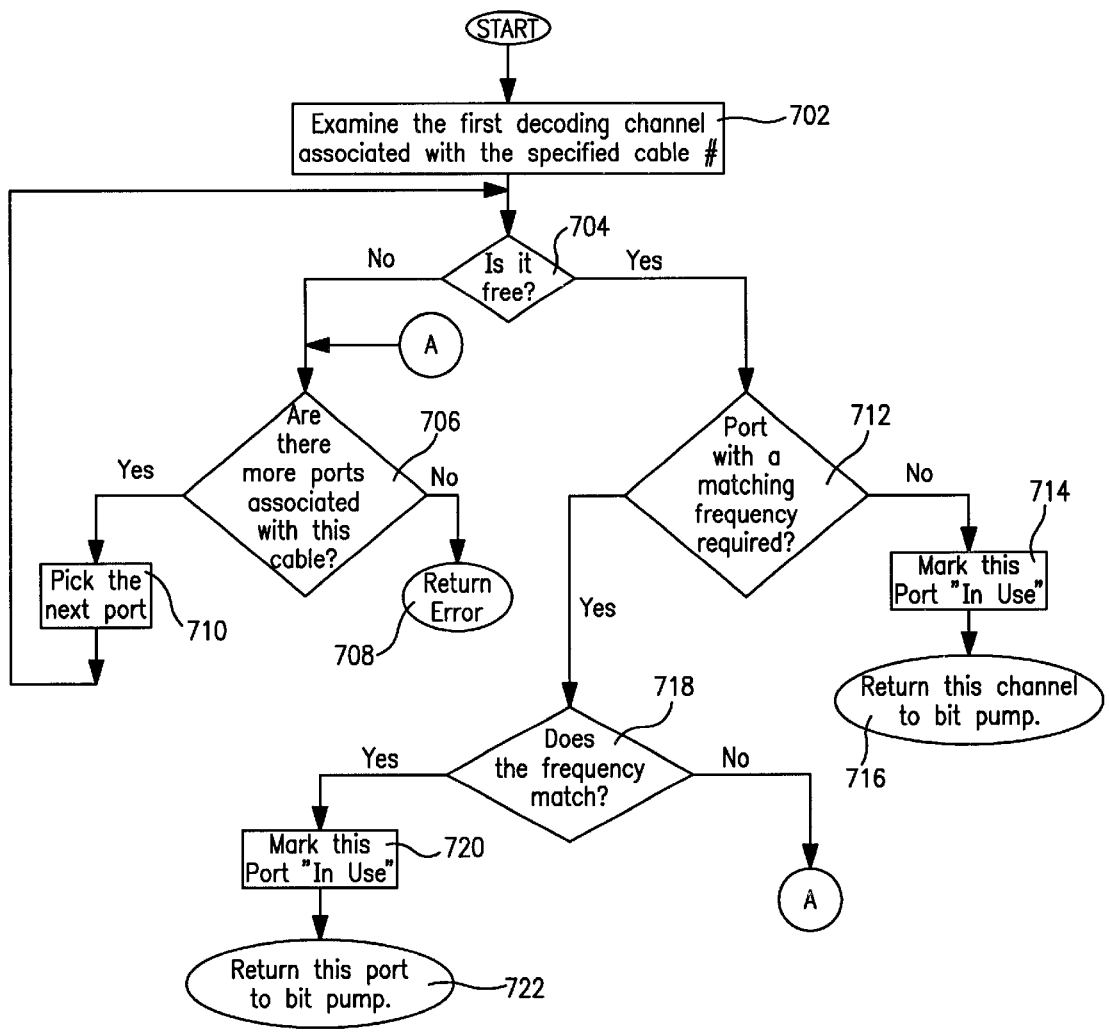
FIG. 9 illustrates a flowchart for channel allocation in one embodiment of the present invention.

FIG. 9 illustrates a flowchart for channel allocation in one embodiment of the present invention. The MCS manager begins by examining the first decoding channel associated with a specified cable number at step 702. The MCS manager must then decide if the first decoding channel is free at step 704. If the first decoding channel is not free then the MCS manager determines whether there are more ports associated with the specified cable number at step 706. If there are no more ports associated with the specified cable then an error is generated at step 708. If there are more ports associated with the specified cable then the MCS manager picks the next port at step 710 and operation returns to step 704.

If the first decoding channel is determined to be free at step 704, then the MCS manager determines whether a port with a matching frequency is required at step 712. If a port with a matching frequency is not required, then the port associated with the specified cable number is marked as being in use at step 714, and the first decoding channel is returned to the bit pump at step 716.

If a port with a matching frequency is determined to be required at step 712, then the MCS manager determines whether the frequency of the port matches the frequency of the decoding channel at step 718. If the frequency of the port does not match the frequency of the decoding channel, then operation continues at step 706 where the MCS manager determines whether there are more ports associated with the specified cable number. If the frequency of the port does match the frequency of the decoding channel, then the port associated with the specified cable number is marked as being in use at step 720, and the first decoding channel is returned to the bit pump at step 722.

Figure 10:
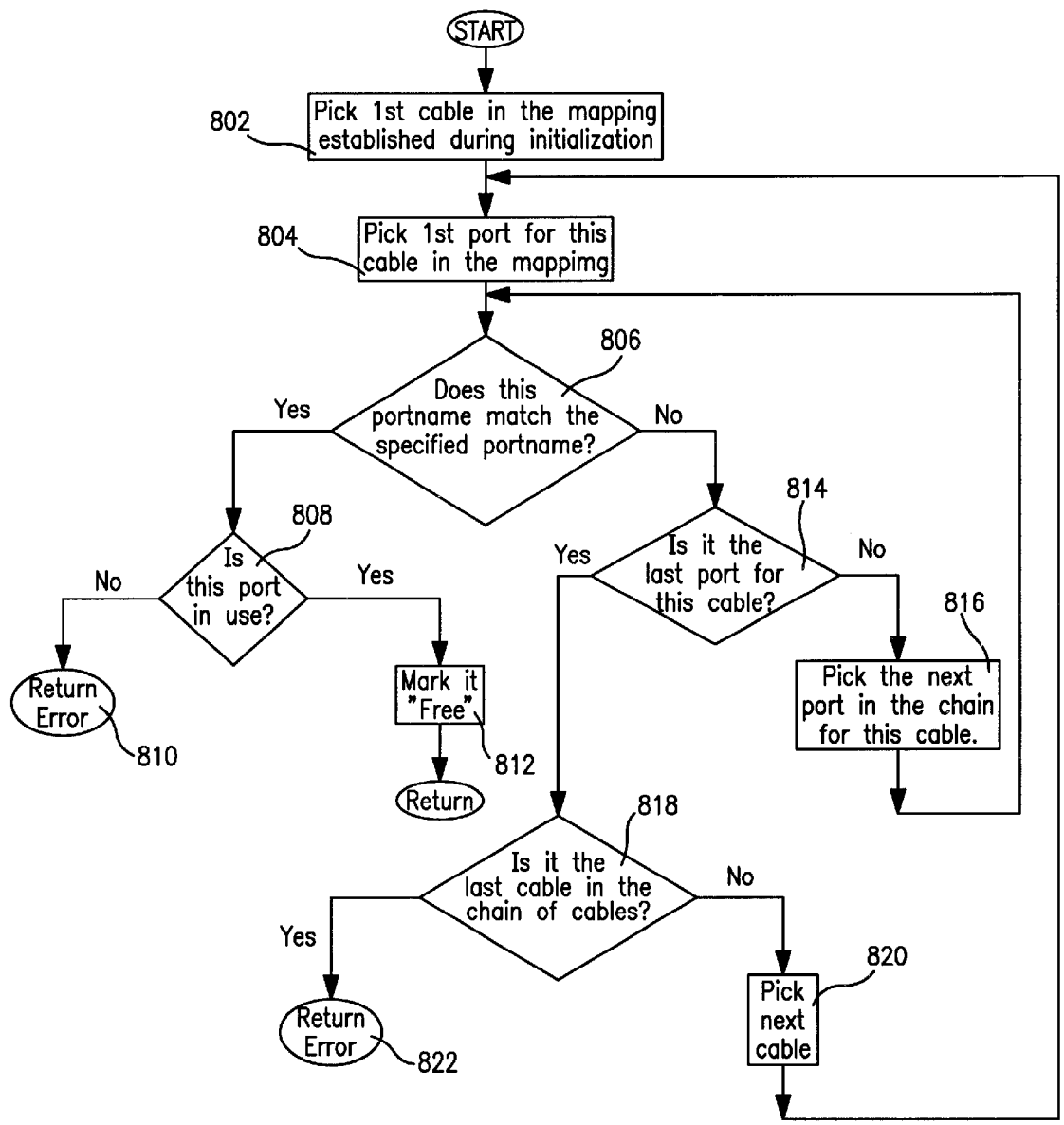
FIG. 10 illustrates a flowchart for channel deallocation in one embodiment of the present invention.

At the end of a video playback, the bit pump communicates with the MCS manager to deallocate the channel previously allocated for the video delivery and makes the channel available for future use. FIG. 10 illustrates a flowchart for channel deallocation in one embodiment of the present invention. The MCS manager selects the first cable in the mapping established during the initialization, at step 802. The first port is then selected for this first cable in the mapping, at step 804. The MCS manager then determines, at step 806, whether the port name of the first port matches the specified port name. If the port name of the first port matches the specified port name then it must be determined whether this port is in use, at step 808. If it is determined that the port is not in use, then a return error is generated at step 810. If it is determined that the port is in use, then the port is marked as being free at step 812.

If the port name of the first port does not match the specified port name at step 806, then the MCS manager determines whether the specified port is the last port for the specified cable, at step 814. If the specified port is not the last port for the specified cable, then the next port in the chain is picked for the specified cable, at step 816, and operation returns to step 806.

If it is determined that the specified port is the last port for the specified cable at step 814, then it is determined whether the specified cable is the last cable in the chain of cables, at step 818. If the cable is not the last cable in the chain of cables, then the next cable is selected at step 820, and operation returns to step 804. If the cable is the last cable in the chain of cables, then an error is generated at step 822.

In the discussion that follows, the method and apparatus of embodiments of the present invention will at times be described with regards to a single transport stream decoded by a single decoder channel of a multiple channel MPEG converter and delivered to a single user. The media server of the present invention, however, supports delivery of multiple channels of data to multiple clients. Thus, the method and apparatus of the embodiments described herein are applicable to all transport streams decoded by all decoder channels of the multiple channel digital media server.

As previously discussed, video delivery in the media server of one embodiment of the present invention is client driven. The MSM provides users with access to the media server by controlling the video streams stored in the MFS. As such, clients communicate with the media server to control the playback speed, including but not limited to, normal play, fast-forward, rewind, stop, and pause. The MSM implements a set of procedures that interact with the MFS to allow the users to control the delivery of program material. A central notion of the MSM is a playlist from which titles can be played on a time-synchronized basis. In the embodiment where the media server is delivering MPEG-2 bit streams or transport streams to multiple channel MPEG converters or decoders, the media server selects and communicates the appropriate packet identifiers (PIDs) to enable each decoder channel to decode the desired program material selected by the user to which that decoder channel is allocated. The PID contains a unique integer value used to associate elementary streams in a single or multiple program MPEG-2 transport stream.

In order to understand how PIDs are used to identify packets to find the desired program material, the MPEG-2 transport stream characteristics are considered. An elementary stream is a generic term for a coded bitstream, for example a coded video or coded audio bitstream. A program is a collection of elementary bitstreams with a common time base intended for synchronized presentation. A transport stream consists of one or more programs, each of which contains one or more elementary streams and other streams multiplexed together.

The elementary stream data is carried in packets called packetized elementary streams (PES). The PES packet consists of a PES packet header followed by PES packet payload. Each elementary stream is labeled with a PID. The PES packets are inserted into transport stream packets having a length of 188 bytes. The transport stream packets begin with a four byte prefix, which contains a 13 bit PID. The PID uses an integer value to identify, via program specific information tables, the contents of the data contained in the transport stream packet. The transport stream packets of one PID value carry data of one elementary stream.

The MPEG-2 transport streams support multiplexing of multiple video and audio elementary streams. As an example, a transport stream may contain one video stream accompanied by several audio streams representing different languages. In this embodiment, each audio stream is labeled with a different PID value. In order for the MPEG decoder to decode the correct stream it should be provided with the PID of the audio stream that is selected for decoding. This information is specified in the PID fields in the transport stream packets of the MPEG-2 stream. The PID field is used to identify packets and demultiplex the desired program streams. Thus, combining of multiple video and audio streams provides, in one embodiment of the present invention, multiple audio streams with a single video stream where each audio streams provides a different language option.

Figure 11:
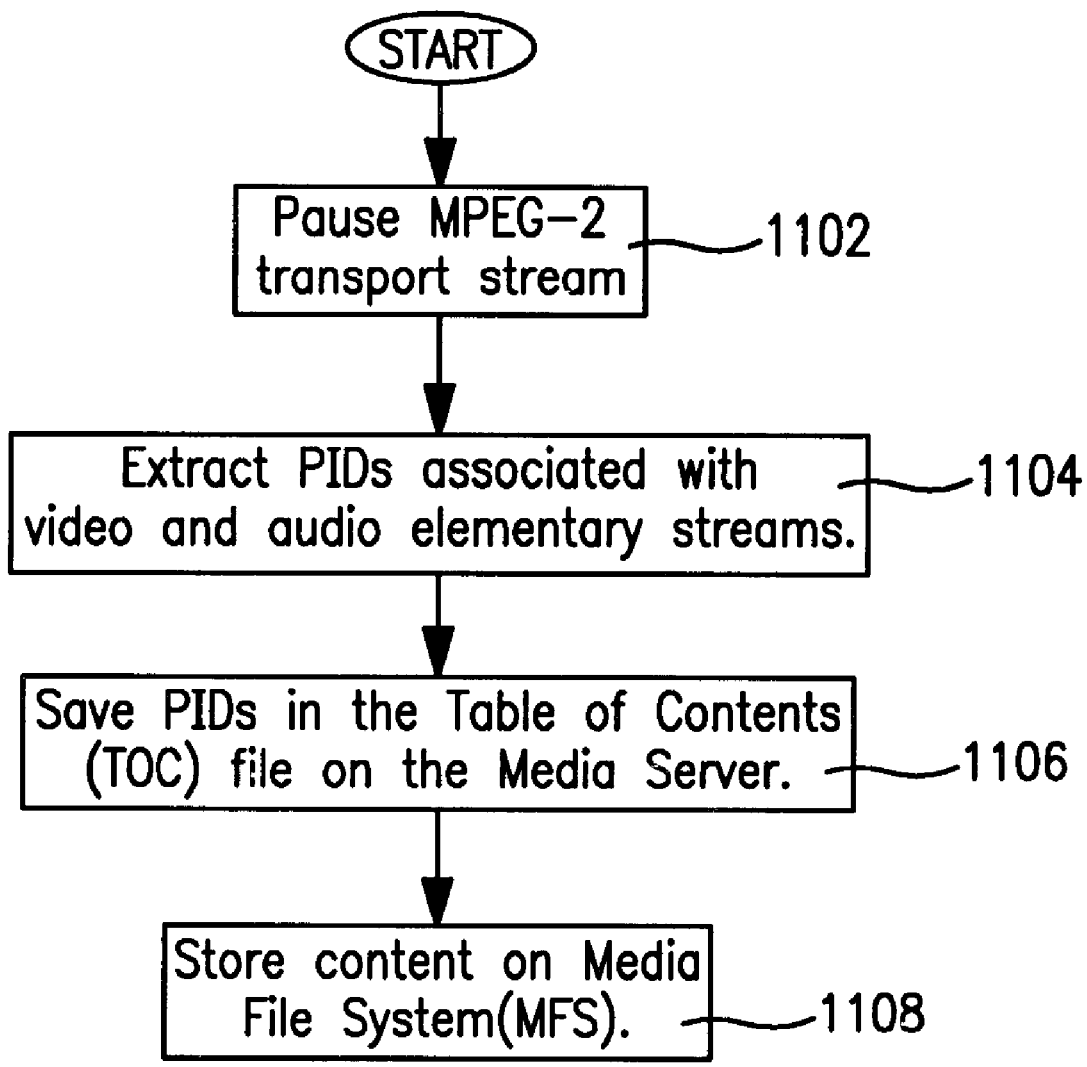
FIG. 11 illustrates a flowchart for the actions carried out by the content manager in loading content on the media server of one embodiment of the present invention.

The media server of one embodiment selects and communicates to the MPEG decoders the appropriate PIDs carrying the video and audio elementary streams in order to enable the decoder channels to decode the desired program material selected by the user. In performing this communication, the media server implements the content manager (CM) which provides the mechanism for storing content on the MFS in one embodiment of the present invention. FIG. 11 illustrates a flowchart for the actions carried out by the content manager in loading content on the media server of one embodiment of the present invention. In block 1102, the CM parses the MPEG-2 transport bit stream while it is being stored on the MFS. The parsing of the transport bit stream is performed to extract the PIDs from the stream, at block 1104. The PIDs are extracted at the time the transport bit stream is stored on the MFS to avoid the parsing overhead at the time of playback, thereby increasing efficiency. This PID information is stored in a Table of Contents (TOC) file associated with this content bit stream, at block 1106. The TOC file is stored on the MFS, at block 1108. The CM also extracts the language identifier field, if present, and stores it in the TOC file. It should be noted that the language identifier field is associated with a PID and some content encoders specify a language identifier in the MPEG bit stream. This language identifier is a three character ASCII string that identifies the language used by the associated elementary stream within the MPEG-2 transport stream.

The media server, as previously discussed with regards to one embodiment, implements a media stream manager (MSM) which controls the playback of multimedia streams that are stored on the media server. The MSM is logically layered on top of the MFS, and the MSM calls into the MFS to start playback of a stream or to stop a playing stream.

Figure 12:
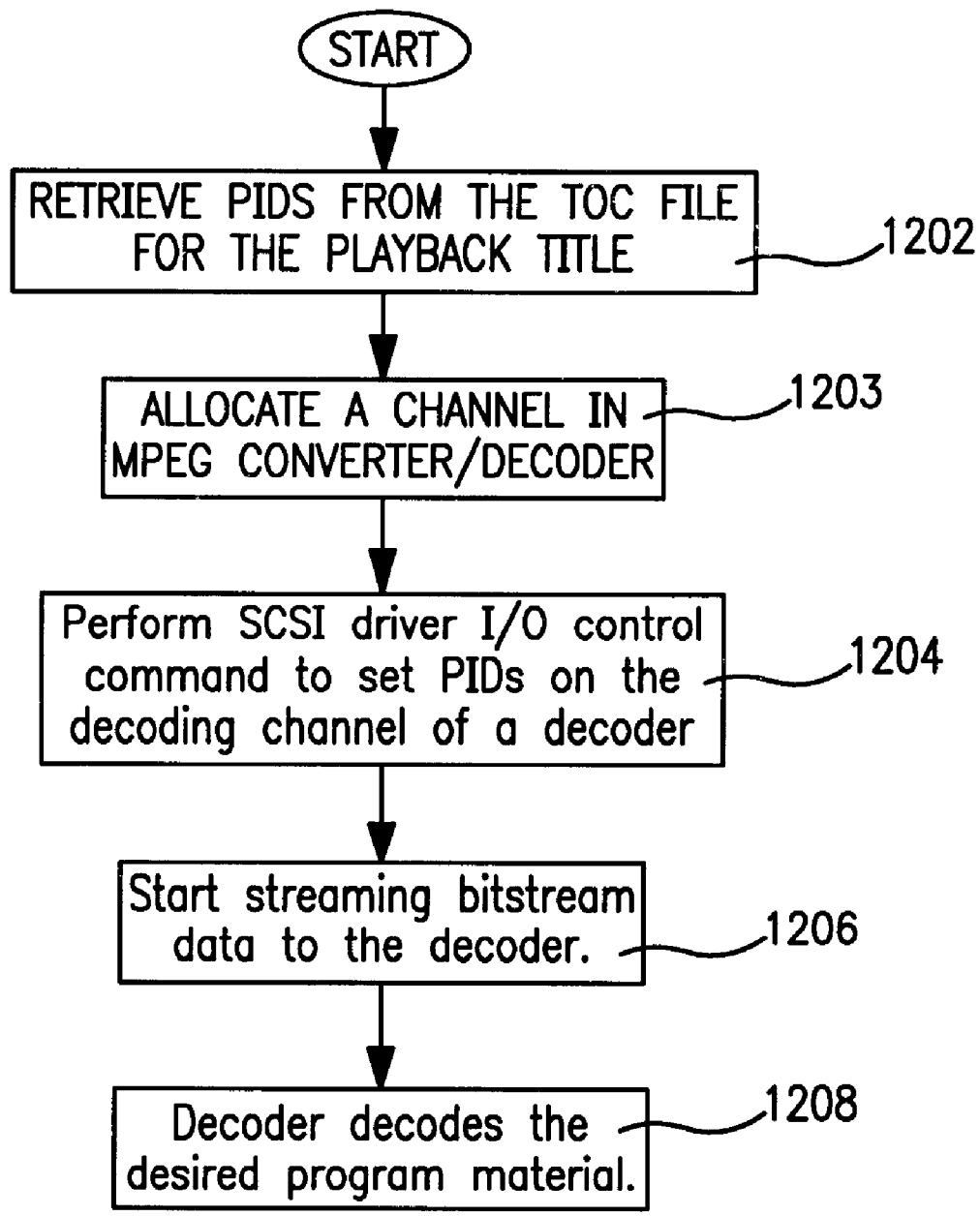
FIG. 12 illustrates a flowchart for the actions carried out by the media server when the playback of a stream is initiated.

FIG. 12 illustrates a flowchart for the actions carried out by the media server when the playback of a stream is initiated. The MSM controls the playback of a transport stream by reading the TOC file to retrieve the PIDs associated with a selected playback title, at block 1202. These PIDs include both audio and video PIDs. When a play command is issued for the transport stream, the MSM causes the MFS to start playback of the selected playback title by opening a stream inside the MFS at the time a title is chosen to be played back to some destination. The MSM also takes into account a language identifier field that may be present in the TOC file. Accordingly, the MSM supports a language preference option at startup. When started with this option, the MSM selects the first PID in the selected playback title stream that has a language matching the language preference option.

Figure 13:
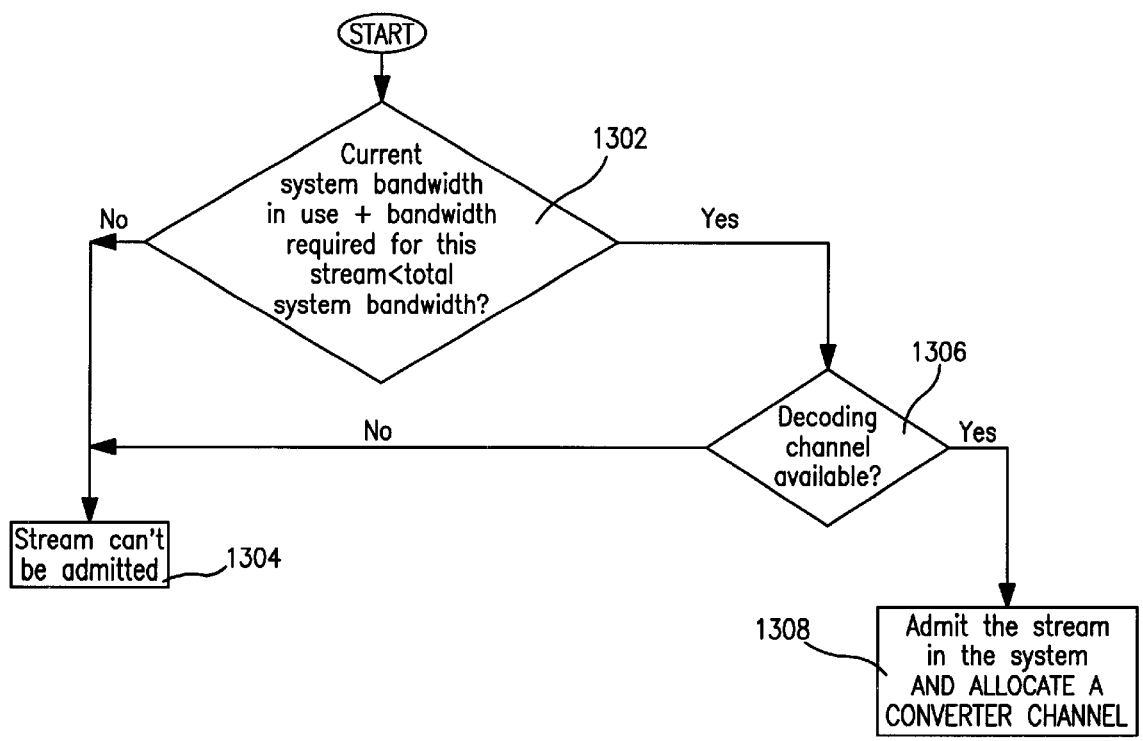
FIG. 13 illustrates a flowchart for admitting a transport stream into the media server of one embodiment of the present invention.

Opening a stream inside the MFS involves admitting a transport stream into the media server and making all resource reservations required so that the transport stream can be delivered from the media server at the specified bitrate. FIG. 13 illustrates a flowchart for admitting a transport stream into the media server of one embodiment of the present invention. Operation begins at block 1302, at which a video stream scheduler determines whether the current system bandwidth in use plus the bandwidth required to support a new transport stream is less than the bandwidth of the total media server system. If admission of the new transport stream will exceed the total system bandwidth of the media server, then the stream is not admitted, at block 1304. If admission of the new transport stream will not cause the total system bandwidth to be exceeded, then the media server system determines whether a decoding channel is available, at block 1306. The video stream scheduler controls the allocation or reservation of media server bandwidth and allows admission of a new transport stream if the additional bandwidth required does not exceed the media server limit. If a decoding channel is available, the media server then allocates and maintains one channel in an MPEG converter for each transport stream admitted, at block 1308. Thus, the number of transport streams that can be admitted equals the number of decoding channels available. If a decoding channel is not available, then the new transport stream is not admitted, at block 1304.

Figure 14:
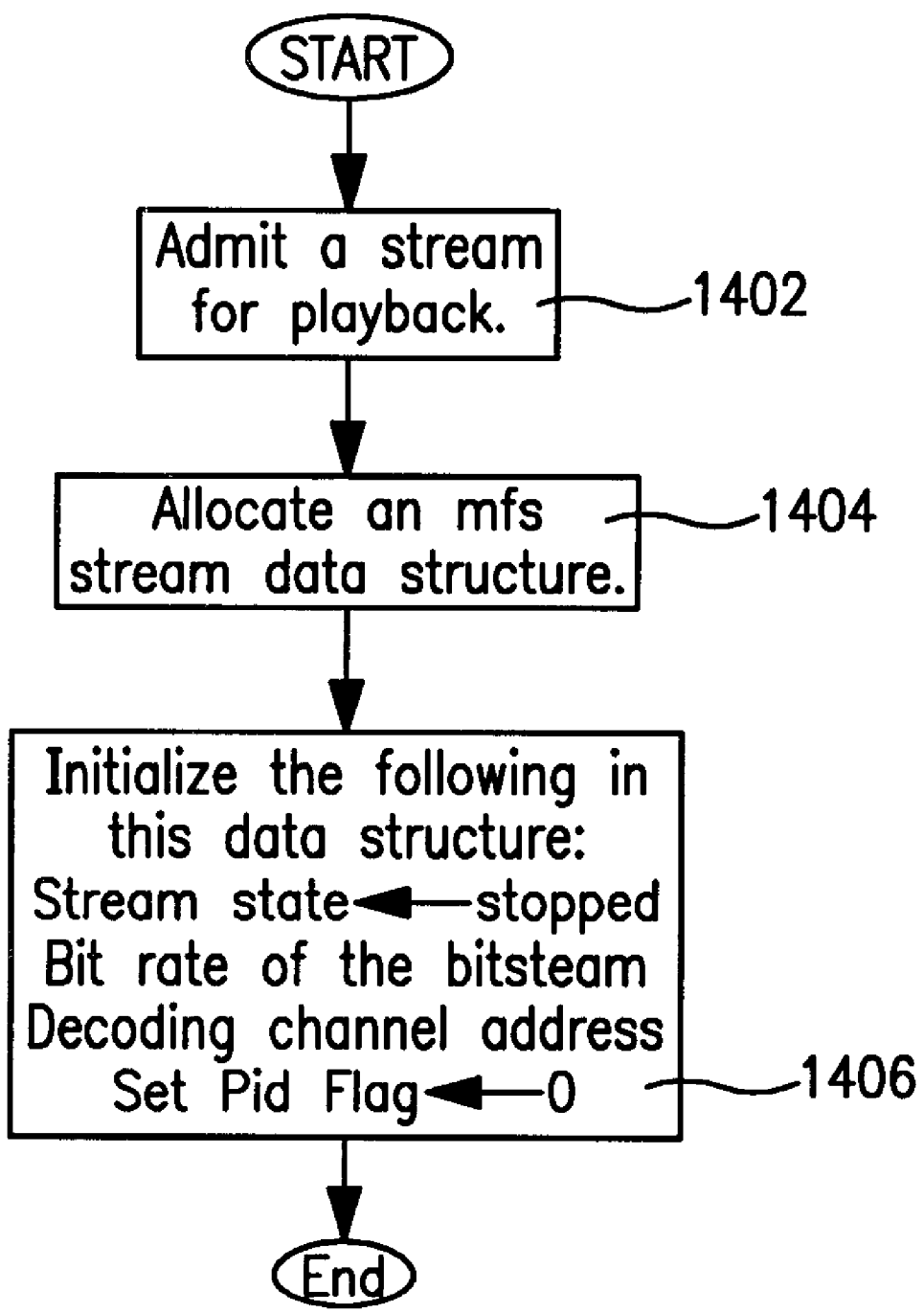
FIG. 14 illustrates a flowchart for initializing a data structure of the MFS of one embodiment of the present invention.

Following the opening of a stream inside the MFS, the MFS data structure is initialized. FIG. 14 illustrates a flowchart for initializing a data structure of the MFS of one embodiment of the present invention. As previously discussed, opening a stream involves admitting a transport stream into the media server and thereby making all resource reservations required so that the transport stream can be delivered from the media server at a specified bitrate, at block 1402. Upon opening of a transport stream, the MFS allocates a data structure for each stream within the MFS, at block 1404. There is one data structure for each admitted transport stream. The data structure fields include: state of the stream (playback or stopped); file descriptor associated with the stream; bitrate of the stream; decoding channel address; MFS file handle; and set PID cache handle. Upon initialization of a data structure, at block 1406, the set PID cache flag is reset for that data structure because the PIDs have not been set for the corresponding decoding channel described in the output destination address field of this data structure. The state of the admitted transport stream is also initialized upon initialization of the data structure, along with the other data structure fields Referring again to FIG. 12, when the playback command is issued, the MSM passes both audio and video PIDs to the MFS. The MFS then initializes an MPEG converter by communicating the audio and video PIDs to the MPEG converter using SCSI driver input/output control commands to the control channel of the MPEG converter, at block 1204. The control commands comprise the extracted program packet identifier information from the digital video stream and the converter channel number which will convert the digital data stream to analog output This initialization of the MPEG converter is accomplished the first time a play command is issued for a particular transport stream. At block 1206, the MFS, disk scheduler, bitpump, and SCSI drivers stream data to a decoder channel of an MPEG converter. The MPEG converter decodes the selected program material, at block 1208.

As previously discussed, each MPEG converter of one embodiment of the present invention comprises six decoding channels and one control channel. This single control channel controls all decoding channels of the MPEG converter. There is one central processing unit per MPEG converter that fields all SCSI interrupts, routes transport streams to available decoding channels, and executes all control commands received. Before a decoding channel can decode a selected transport stream, resulting in the playback of a selected program title, the decoding channel PIDs must be initialized for the selected transport stream.

The MFS bitpump sends MPEG stream data to each decoding channel individually by addressing these channels as separate logical unit numbers (LUNs) on the SCSI bus. The media server implements a SCSI target device driver to connect the MPEG converter to the SCSI bus. The control channel of the MPEG converter is addressed as LUN 0, and the control commands for all decoding channels are sent to LUN 0 on the SCSI bus. The control commands are issued by performing device driver calls, and each control command contains the target LUN (channel) for which the command is intended. The control command and target LUN are embedded in the command sent to LUN 0 on the decoder box. The control commands include: play; stop; set video PID; set audio PID; set modulator frequency; and reset. The MFS issues "set audio PID" and "set video PID" control commands for a particular decoding channel to LUN 0 before causing the disk scheduler and the bit pump to build any schedules for sending MPEG data streams to this decoding channel. Thus, the decoding channel is initialized to demultiplex the program streams selected by the user.

Upon initialization with the correct PIDs, the decoding channel causes the selected program to be demultiplexed upon issuance of a play command. The MFS stores information in the stream data structure indicating that the PIDs associated with the particular stream have been set in the corresponding decoding channel. This is accomplished by setting a PID cache flag in the transport stream data structure upon issuance of the set PID command. This flag indicates to the MFS that the PIDs have been set on a decoding channel associated with the decode of the transport stream being played back. Consequently, when the transport stream is paused, the stream data structure is retained and its state is changed from playback to stop. On resuming play of the stream, the PID caching flag indicates to the MFS that the PIDs have already been set in the decoding channel for a particular transport stream. Therefore, the PIDs are not required to be initialized again so the MFS causes the decoding channel to resume decoding without initializing the PID control bits. This reduces the chance of video interruption on other converter channels as a result of data starvation on other converter channels, the data starvation resulting from the reinitialization of the PIDs on a converter's channels via the single central processing unit each time a play or stop command is issued for any of the decoder channels. As a result, the playing and pausing or stopping of a transport stream on one decoding channel of a converter does not affect the other converter channels, and the video playback on those other channels continues without interruption.

Figure 15:
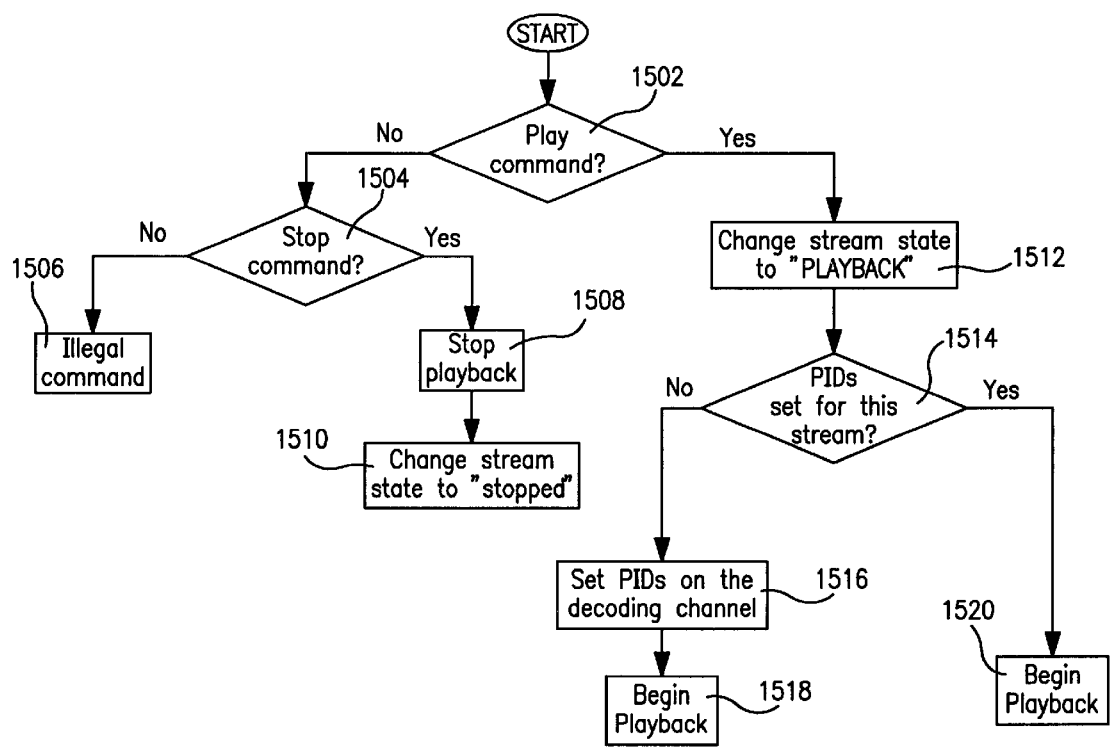
FIG. 15 illustrates a flowchart for the execution of play and stop commands by the MFS of one embodiment of the present invention.

FIG. 15 illustrates a flowchart for the execution of play and stop commands by the MFS of one embodiment of the present invention. Operation begins at block 1502, at which the MFS determines whether a play command has been received. If it is determined that a play command has not been received, then the MFS determines whether a stop command has been received, at block 1504. If it is determined that neither a play command nor a stop command were received, then the MFS determines that an illegal command has been received, at block 1506. If it is determined that a stop command was received, then playback of selected program is stopped, at block 1508, and the state of the transport stream is changed to stopped, at block 1510.

If it is determined that a play command was received, at block 1502, then the state of the transport stream is changed to playback, at block 1512. Cperation then continues at block 1514, at which the MFS determines if the PIDs are set for this transport stream. If it is determined that the PIDs are set for the transport stream, then the MFS begins playback of the transport stream, at block 1520. If it is determined that the PIDs have not been initialized for the transport stream, then the MFS sets the PIDs on the decoding channel, at block 1516. Following initialization of the PIDs, the MFS begins playback of the transport stream, at block 1518.

Thus, a method and apparatus for providing analog output and managing channels on a multiple channel digital media server have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for delivering analog data on demand from a multiple channel digital media server, the method comprising the steps of:

initializing a plurality of control bits of at least one channel of at least one converter using at least one control channel;

maintaining a data structure for each of at least one of a plurality of admitted digital data streams, wherein the data structure controls the conversion of the each of at least one of a plurality of admitted digital data streams to at least one of a plurality of analog data streams on each of the at least one channel of at least one converter, the data structure eliminating the need to reinitialize of the plurality of control bits during state changes of the each of at least one of a plurality of admitted digital data streams.

2. The method of claim 1, further comprising the step of initializing the data structure for the each of at least one of a plurality of admitted digital data streams, the step of initalizing comprising initializing a state of the each of at least one of a plurality of admitted digital data streams and a control bit cache flag at a first requested state change for each of the at least one of a plurality of admitted digital data streams.

3. The method of claim 1, wherein the plurality of control bits comprises a plurality of program packet identifiers, the plurality of program packet identifiers comprising an integer value used to associate elementary streams in a motion picture experts group (MPEG) transport stream.

4. The method of claim 1, wherein the plurality of control bits are initialized at a first requested state change for each of the at least one of a plurality of admitted digital data streams.

5. The method of claim 4, wherein the first requested state change for each of the at least one of a plurality of admitted digital data streams is a play command.

6. The method of claim 1, further comprising the steps of:

admitting at least one digital data stream when at least one user selects at least one program for playback;

reserving bandwidth of the multiple channel digital media server to deliver the at least one digital data steam at a specified bitrate;

initializing a data structure for each of the at least one digital data streams.

7. The method of claim 1, further comprising the step of converting the at least one of a plurality of admitted digital data streams to the at least one of a plurality of analog data streams using a motion pictures expert group (MPEG) decoder, wherein the plurality of admitted digital data streams are MPEG transport streams, one of a plurality of decoder channels converting the each of at least one of a plurality of admitted digital data streams.

8. A media server comprising:

at least one converter having at least one converter channel and having at least one control channel, the at least one converter channel having an initialized plurality of control bits;

a data structure for each of at least one of a plurality of admitted digital data streams, wherein the data structure controls the conversion of the each of at least one of a plurality of admitted digital data streams to at least one of a plurality of analog data streams on each of the at least one converter channel, the data structure eliminating the need to reinitialize of the plurality of control bits during state changes of the each of at least one of a plurality of admitted digital data streams.

9. The media server of claim 8, wherein the data structure is initialized for the each of at least one of a plurality of admitted digital data streams, the initialization comprising initializing a state of the each of at least one of a plurality of admitted digital data streams and a control bit cache flag at a first requested state change for each of the at least one of a plurality of admitted digital data streams.

10. The media server of claim 8, wherein the plurality of control bits comprises a plurality of program packet identifiers, the plurality of program packet identifiers comprising an integer value used to associate elementary streams in a motion picture experts group (MPEG) transport stream.

11. The media server of claim 8, wherein the plurality of control bits are initialized at a first requested state change for each of the at least one of a plurality of admitted digital data streams.

12. The media server of claim 8, wherein at least one digital data stream is admitted when at least one user selects at least one program for playback, wherein bandwidth of the multiple channel digital media server is reserved to deliver the at least one digital data steam at a specified bitrate, wherein the data structure is initialized for each of the at least one digital data streams.

13. The media server of claim 8, wherein the at least one of a plurality of admitted digital data streams is converted to the at least one of a plurality of analog data streams using a motion pictures expert group (MPEG) decoder, wherein the plurality of admitted digital data streams are MPEG transport streams, one of a plurality of decoder channels converting the each of at least one of a plurality of admitted digital data streams.

14. A computer readable medium containing executable instructions which, when executed in a processing system, causes the system to perform the steps for delivering analog data to a user in a multiple channel media server comprising the steps of:

initializing a plurality of control bits of at least one channel of at least one converter using at least one control channel;

maintaining a data structure for each of at least one of a plurality of admitted digital data streams, wherein the data structure controls the conversion of the each of at least one of a plurality of admitted digital data streams to at least one of a plurality of analog data streams on each of the at least one channel of at least one converter, the data structure eliminating the need to reinitialize the plurality of control bits during state changes of the each of at least one of a plurality of admitted digital data streams.

15. The computer readable medium of claim 14, further causing the system to perform the step of initializing the data structure for the each of at least one of a plurality of admitted digital data streams, the step of initializing comprising initializing a state of the each of at least one of a plurality of admitted digital data streams and a control bit cache flag at a first requested state change for each of the at least one of a plurality of admitted digital data streams.

16. The computer readable medium of claim 14, wherein the plurality of control bits comprises a plurality of program packet identifiers, the plurality of program packet identifiers comprising an integer value used to associate elementary streams in a motion picture experts group (MPEG) transport stream.

17. The computer readable medium of claim 14, wherein the plurality of control bits are initialized at a first requested state change for each of the at least one of a plurality of admitted digital data streams.

18. The computer readable medium of claim 17, wherein the first requested state change for each of the at least one of a plurality of admitted digital data streams is a play command.

19. The computer readable medium of claim 14, further causing the system to perform the steps of:

admitting at least one digital data stream when at least one user selects at least one program for playback;

reserving bandwidth of the multiple channel digital media server to deliver the at least one digital data steam at a specified bitrate;

initializing a data structure for each of the at least one digital data stream.

20. The computer readable medium of claim 14, further causing the system to perform the step of converting the at least one of a plurality of admitted digital data streams to the at least one of a plurality of analog data streams using a motion pictures expert group (MPEG) decoder, wherein the plurality of admitted digital data streams are MPEG transport streams, one of a plurality of decoder channels converting the each of at least one of a plurality of admitted digital data streams.

* * * * *

UNITED STATES PATENT AND TRADEMARK OFFICE
CERTIFICATE OF CORRECTION

PATENT NO. : 6,360,368 B1
DATED : March 19, 2002
INVENTOR(S) : Chawla

It is certified that error appears in the above-identified patent and that said Letters Patent is hereby corrected as shown below:

Column 3,
Line 28, please delete "the figure of the" and insert -- the figures of the --.

Signed and Sealed this

Seventh Day of June, 2005

JON W. DUDAS
*Director of the United States Patent and Trademark Office*